United States Patent [19]
Chamberlain

[11] 3,922,004
[45] Nov. 25, 1975

[54] VEHICLE LOAD SECURING DEVICE
[75] Inventor: Bruce C. Chamberlain, Amersham, England
[73] Assignee: Winn-Boughton Limited, England
[22] Filed: Oct. 31, 1973
[21] Appl. No.: 411,194

[30] Foreign Application Priority Data
Feb. 14, 1973 United Kingdom............... 7134/73

[52] U.S. Cl............................ 280/179 R; 105/367
[51] Int. Cl.² ........................................ B60P 7/12
[58] Field of Search......... 280/179 R; 105/367, 243, 105/369 R; 248/119 R; 49/343

[56] References Cited
UNITED STATES PATENTS

| | | | |
|---|---|---|---|
| 1,475,012 | 11/1923 | Harris | 49/343 |
| 2,144,410 | 1/1939 | Ludington | 280/179 R |
| 2,331,416 | 10/1943 | Muller | 280/179 R |
| 2,942,912 | 6/1960 | Lucas | 280/179 R |
| 3,197,236 | 7/1965 | Burton | 280/179 R |
| 3,387,813 | 6/1968 | Carino | 248/119 R |
| 3,628,466 | 12/1971 | Lyons | 105/367 |

Primary Examiner—Philip Goodman
Assistant Examiner—John A. Carroll
Attorney, Agent, or Firm—Irving M. Weiner

[57] ABSTRACT

This invention relates to the transport of objects of varying shapes and sizes and may be applied to the construction of vehicles, to pallets for attachment to vehicles and to containers and demountable bodies. In accordance with the invention pairs of pivotally mounted platforms are arranged in the vehicle body or pallet in such a way that each pair is individually movable from a position in which the two platforms of that pair are coplanar, to a position in which the two platforms are relatively inclined and between them provide a support for a cylindrical body.

The platforms are preferably mounted down the sides of a flat rectangular framework and each is controlled by a pair of support arms pivoted on an axle carrying friction pads or wheels which run on suitable tracks extending across the framework. Means are provided for driving the axles inwardly and outwardly to lower and lift the platforms about their pivot axes.

13 Claims, 9 Drawing Figures

VEHICLE LOAD SECURING DEVICE

This invention relates to the transport of objects, and particularly large objects, which do not have flat bases nor co-planar support members such as legs or wheels. The work "base" is used herein to refer to the side or surface of an object on which the object is to rest during transportation. Thus, the invention is applicable to objects which do have one or more flat sides, but which are so shaped or dimensioned that it is impracticable for them to rest on their flat sides during transportation. Particular examples of objects with non-flat bases are generally cylindrical objects such as rolls or coils of steel sheeting, boilers, rockets and the like. Accordingly, objects with which the invention is concerned will be referred to hereinafter as "cylindrical objects", but it is to be understood that the invention is equally applicable to the transportation of objects which are not cylindrical in the strict geometric sense of the word, but have uniform or non-uniform, curved or angulated bases. Examples of such objects include boats and aircraft fuselages.

Objects of the kind referred to above may be transported on normal vehicles having flat, platform-type bodies or in normal containers, provided wedges or other suitably shaped members are inserted between the body and the object to give the body support during transportation. Such arrangements are time-consuming and not always particularly satisfactory and, accordingly, when a particular object has to be transported continually, or when a number of similar objects have to be transported, special bodies or containers may be built, the bases of such containers being specially shaped to conform to the bases of the objects. Such specially-built bodies or containers cannot normally be satisfactorily used with any objects except those for which they are specially designed and, accordingly, this solution can only be adopted in relatively rare cases.

It is an object of the present invention to provide a new solution to this problem and in particular to provide a vehicle body or a pallet which can be used on a vehicle and, in particular, a container vehicle, for the transportation of cylindrical objects of varying shapes and sizes. The invention may be applied to the construction of a vehicle, for example, a road trailer or rail truck, or it may be applied to a pallet for attachment to a vehicle, or it may be applied to a container or a demountable body for use in any form of transport.

From one aspect the invention consists in a vehicle body or pallet for use in the transport of cylindrical objects, comprising a plurality of pairs of pivotally-mounted platforms arranged so that each pair is individually movable from a first position in which the two platforms of that pair are coplanar to a second position in which the two platforms are relatively inclined and between them provide a support for one of said cylindrical objects.

An embodiment of the invention may consist primarily of a flat, rectangular framework of a size zuitable for mounting on a vehicle chassis or in a container of the type having a removable cover or removable top and sides. In this framework are mounted a plurality of pairs of platforms, one platform in each pair being located on either side of the longitudinal axis of the framework. Preferably, the pivot axes of all the platforms on one side of the framework are coincident as also are the pivot axes of all the platforms on the other side of the framework. These pivot axes are preferably equally spaced from the longitudinal axis of the framework, the distance between them being determined by the diameter of the smallest cylindrical object to be transported.

Preferably, each platform is movable from the first position to the second position under the control of a pair of support arms, pivotally attached at one end to the platform. At the other end, these support arms are pivoted on an axle carrying friction pads or wheels running on suitable tracks extending transversely of the pallet. The centre of this axle is provided with a nut or the like, located on a threaded rod also extending transversely of the framework. Means are provided for rotating each rod and, thus, causing the axle to travel towards or away from the longitudinal axis of the framework. This transverse movement of the axle is transferred through the support arms to the respective platform, causing it to rise or fall about its pivot axis in accordance with the direction of rotation of the threaded rod.

Rotation of the rods may be controlled mechanically or hydraulically, but in a preferred embodiment of the invention, the two rods controlling each pair of platforms are connected to a gearbox located on the longitudinal axis of the framework. The input shaft of each gearbox is coupled to a convenient position for manual operation, the arrangement being such that, when said input shaft is rotated, the two rods are turned in the directions necessary to move the two platforms of the respective pair upwards or downwards together. In one particular arrangement, the input shafts are coupled through longitudinally extending rods and universal joints to an operating position at one end of the framework.

It will be understood that the cylindrical objects such as coils of steel plate are placed on the pallet or vehicle body with their axes in the fore-and-aft, longitudinal central plane of the pallet or vehicle body. Thereafter, the appropriate platforms are raised to prevent the objects from rolling away from the centre of the pallet or vehicle body. In the case of heavy objects, additional lashings are provided and, for this purpose, suitable lashing points are preferably provided on the outer edge of each platform. In addition, means are provided to prevent fore-and-aft motion of each cylindrical object and this means may be constituted, for example, by posts insertable in sockets in the pallet or vehicle body. A line of posts may be provided, for example, substantially along the line of the two pivot axes of the pairs of platforms.

It is to be understood that a pallet in accordance with the invention may be used on vehicles other than road vehicles. For example, a pallet may be designed so that it is suitable for use on a rail truck. Further, a pallet in accordance with the invention may either be fitted into a container or may be designed to be secured to a truck or trailer, for example, by means of a twist lock system. Further, a vehicle body in accordance with the invention may be incorporated in a road vehicle, such as a truck or trailer, or in a rail truck.

Methods of performing the invention will now be described with reference to the accompanying diagrammatic drawings, in which.

Figure 1:
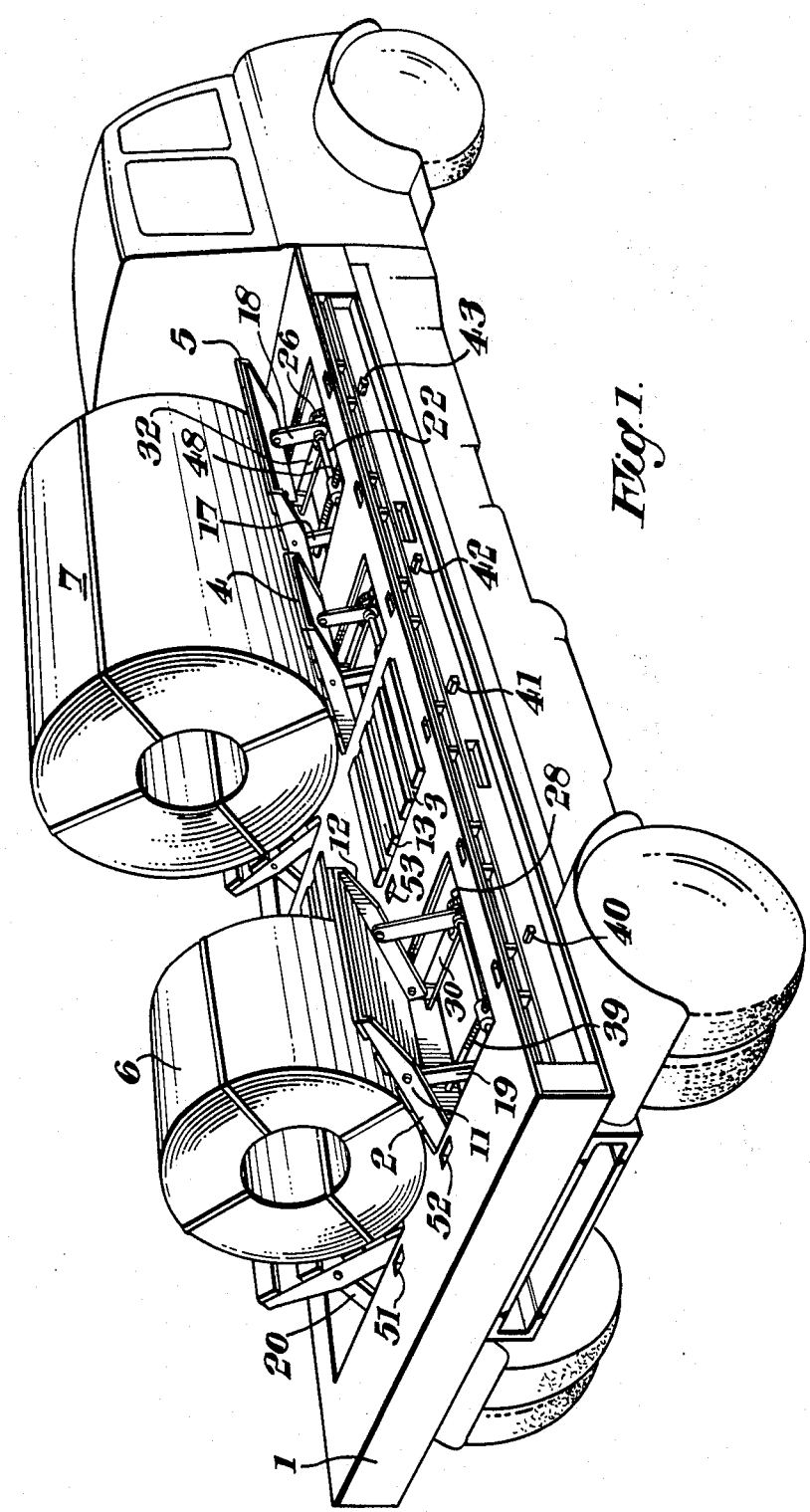
FIG. 1 is a perspective view of a vehicle incorporating a pallet in accordance with the invention.
Figure 2:
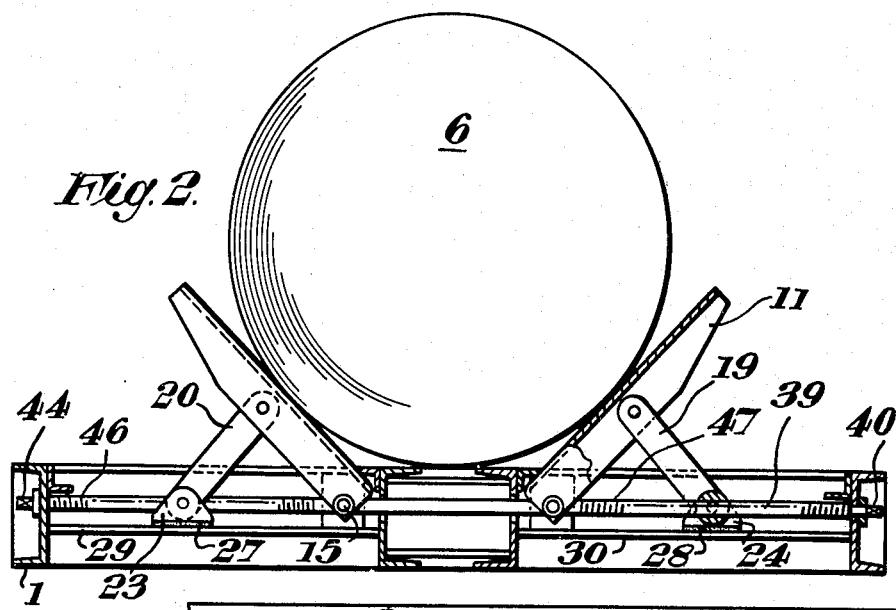
FIG. 2 is a cross-sectional view of a part of the pallet shown in FIG. 1.
Figure 3:
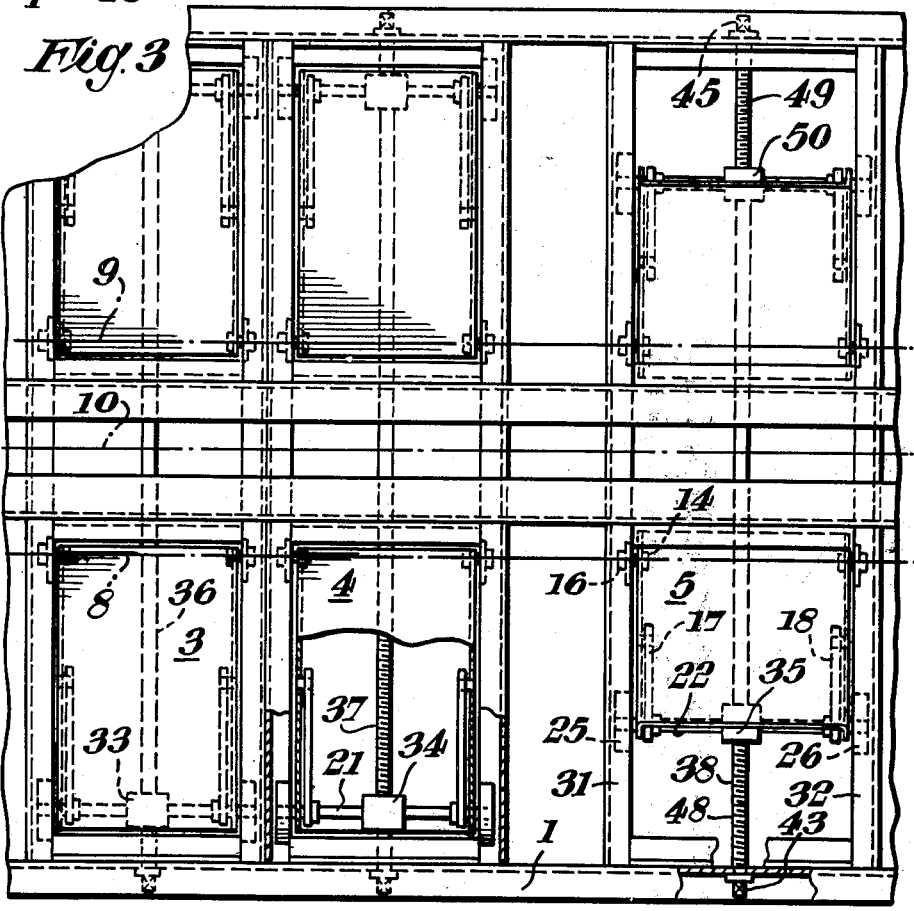
FIG. 3 is a plan view of a part of the pallet illustrated in FIGS. 1 and 2.
Figure 4:
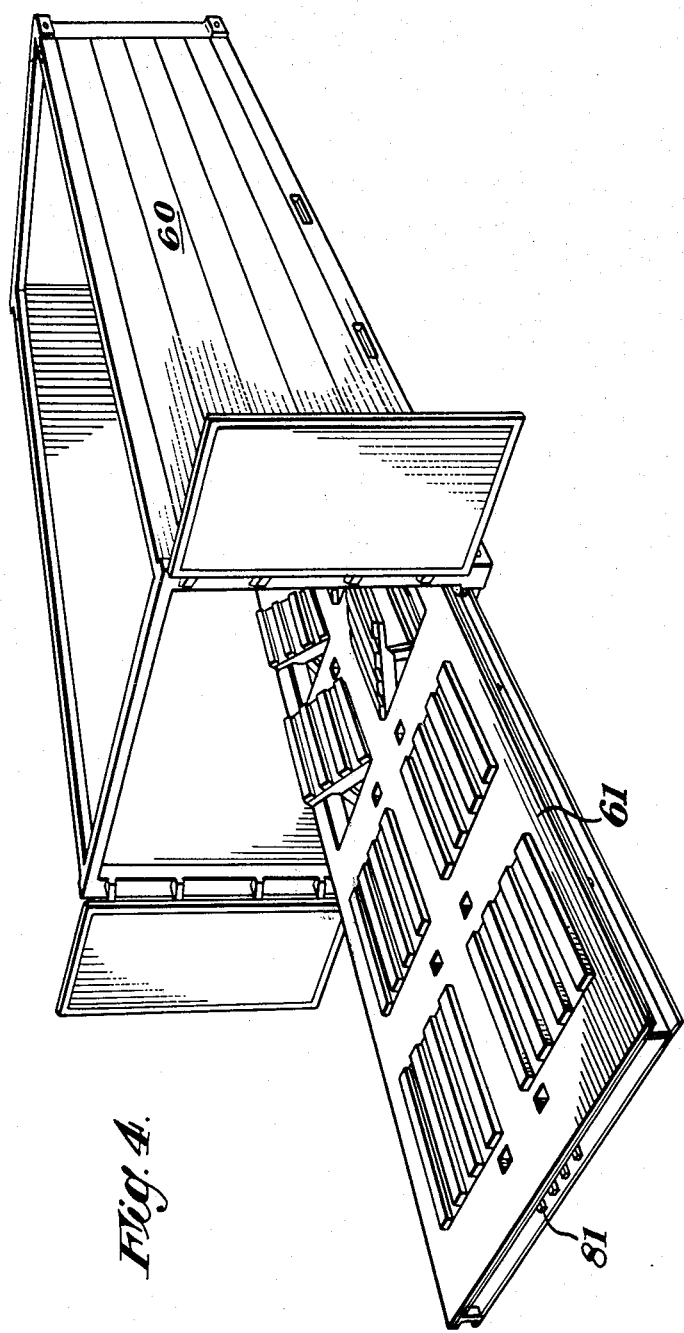
FIG. 4 is a perspective view of a second embodiment of the invention shown partially within a container.

The pallet illustrated in FIGS. 1 to 3 consists primarily of a flat rectangular framework 1 of a size suitable for mounting on a vehicle chassis, as shown in FIG. 1. It is to be understood that the framework may be readily removable from the vehicle chassis, or may be built in to the vehicle on a permanent or semi-permanent basis. The pallet illustrated includes four pairs of platforms 2, 3, 4 and 5, the platform 2 being shown in FIG. 1 in the position to support a coil of steel sheeting 6, the pair of platforms 3 being shown in the horizontal position and the pairs of platforms 4 and 5 being shown in position to support together a large roll of steel sheeting 7. As can be seen from the drawings, one platform in each pair is located on one side of the longitudinal axis of the framework 1 and the other platform in each pair is located on the other side of said longitudinal axis. Each of the platforms is mounted for pivotal movement about a pivot axis, the pivot axes of all the platforms on one side of the longitudinal axis being coincident and the pivot axes of all the platforms on the other side of the longitudinal axis also being coincident. The line of the pivot axes on one side of the framework is shown in FIG. 3 at 8 and the line of the pivot axes on the other side of the framework is indicated at 9. It will be seen that these pivot axes are equally spaced from the longitudinal axis of the framework which is indicated by the line 10. The distance between the lines 8 and 9 is determined by the size of the smallest cylindrical article to be carried.

Each of the platforms includes a pair of side members such as those shown for one of the platforms 2 at 11 and 12 and a plurality of slats such as that shown at 13 for one of the platforms 3. The side members are provided with bosses such as that shown at 14 for one of the platforms 5 in FIG. 3, and each of these bosses has fixed therein a stub axle, such as that indicated at 15 in FIG. 2, rotatable in a bearing in a transverse frame member such as that indicated at 16 in FIG. 3.

Each platform is also provided with a pair of support arms such as those indicated at 17 and 18 in FIGS. 1 and 3, and those indicated at 19 and 20 in FIGS. 1 and 2. One end of each of the support arms is pivotally connected to a respective one of the side members of the associated platform. The other end of each of the suport arms is pivoted on an axle such as those shown at 21 and 22 in FIG. 3. Each axle carries at its ends a pair of trunnions such as those shown at 23 and 24 in FIG. 2, and at 25 and 26 in FIG. 3. Each of these trunnions has a pad of friction material on its underside as shown at 27 and 28 in FIG. 2. The pads rest on, and are slidable along, transverse rails such as those illustrated at 29 and 30 in FIG. 2 and 31 and 32 in FIG. 3. Fixed to the centre of each axle is a nut or threaded block such as those shown at 33, 34, 35 and 50 in FIG. 3. Passing through each of these nuts or blocks is a threaded rod such as those illustrated at 36, 37 and 38 in FIG. 3 and 39 in FIG. 2. Each end of each of the threaded rods extend through one of the side members of the framework 1, for example, as shown at 40, 41, 42 and 43 in FIG. 1, at 40 and 44 in FIG. 2 and at 43 and 45 in FIG. 3. Each end of each rod is square or hexagonal in shape to receive a key by means of which the rod can be rotated. Thrust means are provided to prevent axial motion of each of the rods and, accordingly, it will be seen that, if any of the rods is rotated, the two nuts or threaded blocks located thereon will be caused to move axially with respect to the rod and, hence, transversely with respect to the framework. The threads on the two ends of the rod are of opposite senses as can be seen, for example, at 46 and 47 in FIG. 2 and at 48 and 49 in FIG. 3. Thus, rotation of, for example, the rod 38 in one direction will cause the two nuts or blocks 35 and 50 to move inwardly towards the longitudinal axis 10, while rotation of the rod 38 in the opposite direction will cause the two nuts or blocks to move outwardly away from the longitudinal axis. Movement of the two nuts or blocks is, of course, accompanied by corresponding movement of the axles to which they are attached and sliding motion of the trunnions at the ends of the axles. Furthermore, it is accompanied by movement of the support arms and consequent pivotal movement of the platforms. Inward movement of the nuts or blocks causes the platforms to pivot upwardly towards the supporting position shown in FIG. 2 and outward movement of the nuts or blocks causes the platforms to move towards the horizontal or flat position. Since the threaded rods project on either side of the pallet, movement of the platform can be controlled from either side of the vehicle as may be convenient.

It will be understood that, in the embodiment illustrated in FIGS. 1 to 3, cylindrical objects such as rolls or coils of steel plate 6 and 7 are placed on the pallet with their axes in the fore-and-aft longitudinal centre plane of the pallet. Thereafter, the appropriate platforms are raised by means of the threaded rods to the positions shown in FIGS. 1 and 2 for the pairs of platforms 2, 4 and 5. In the case of heavy objects, additional lashings are provided and, for this purpose, suitable lashing points are provided on the outer edges of each pallet. In addition, means are provided to prevent for-and-aft motion of each cylindrical object and this means may be constituted, for example, by posts insertable in sockets in the pallet such as those shown at 51, 52 and 53 in FIG. 1.

In an alternative embodiment of the invention (not illustrated) the pivot axes of the platforms are arranged transversely instead of longitudinally so that the cylindrical objects will then be loaded with their longitudnal axes transverse with respect to the vehicle instead of fore-and-aft. If desired, a combination of transverse and longitudinal pivot axes may be used.

Preferably, the framework of the pallet is formed from steel and the platforms are steel-framed. However, the pallet and the surface of each platform is preferably covered with wood. If desired, spaces may be left at each end of the pallet without movable platforms. These spaces are covered by wood, as previously mentioned, and may be used for the transport of flat plates. It is, of course, to be understood that, if a large load of flat plates is to be transported, some or all of the movable platforms may be left in the lowered position shown for the platforms 3 in FIG. 1 and the plates may be loaded on top of these platforms.

The embodiment of the invention illustrated in FIGS. 4 to 9 is generally similar to that illustrated in FIGS. 1 to 3 but, in this case, is designed for use in a standard transportable container. Such a container may be transported on a road vehicle, a rail truck or in a ship or aircraft. The container is shown at 60 in FIG. 4 and the pallet is indicated generally at 61. As already stated, the pallet is generally similar to that described with reference to FIGS. 1 and 3 and, accordingly, only the points of difference will be described in detail.

Since this particular embodiment of the invention is designed for use in a container, the sides of the pallet will not necessarily be accessible and, accordingly, arrangements are made to enable the platforms to be raised and lowered from one end of the pallet instead of from the sides. Thus, the single threaded rods 36, 37 and 38 of FIG. 3 are replaced by pairs of threaded rods such as those indicated at 62 and 63 in FIG. 5. Each pair of rods is carried in thrust bearings such as those indicated at 64, 65, 66 and 67 in FIG. 5. The inner ends of the two rods 62 and 63 are extended into the gearbox 68 having bevel gears 69 and 70 fixed to the rods 62 and 63, respectively. In mesh with the two gears 69 and 70 is a third bevel gear 71 connected to a short shaft 72 extending through the gearbox wall. This shaft is connected to a further shaft 73 through a universal joint 74, and the shaft 73 is itself connected to a shaft 75 through a second universal joint 76. The shaft 75 is carried in bearings 77, 78, 79 and 80 and extends to a square or hexagonal end 81 at the rear end of the pallet. Similar arrangements are provided for the remaining three pairs of platforms and, as can be seen, the operating ends of all the shafts are conveniently placed together at the rear end of the pallet.

Figure 5:
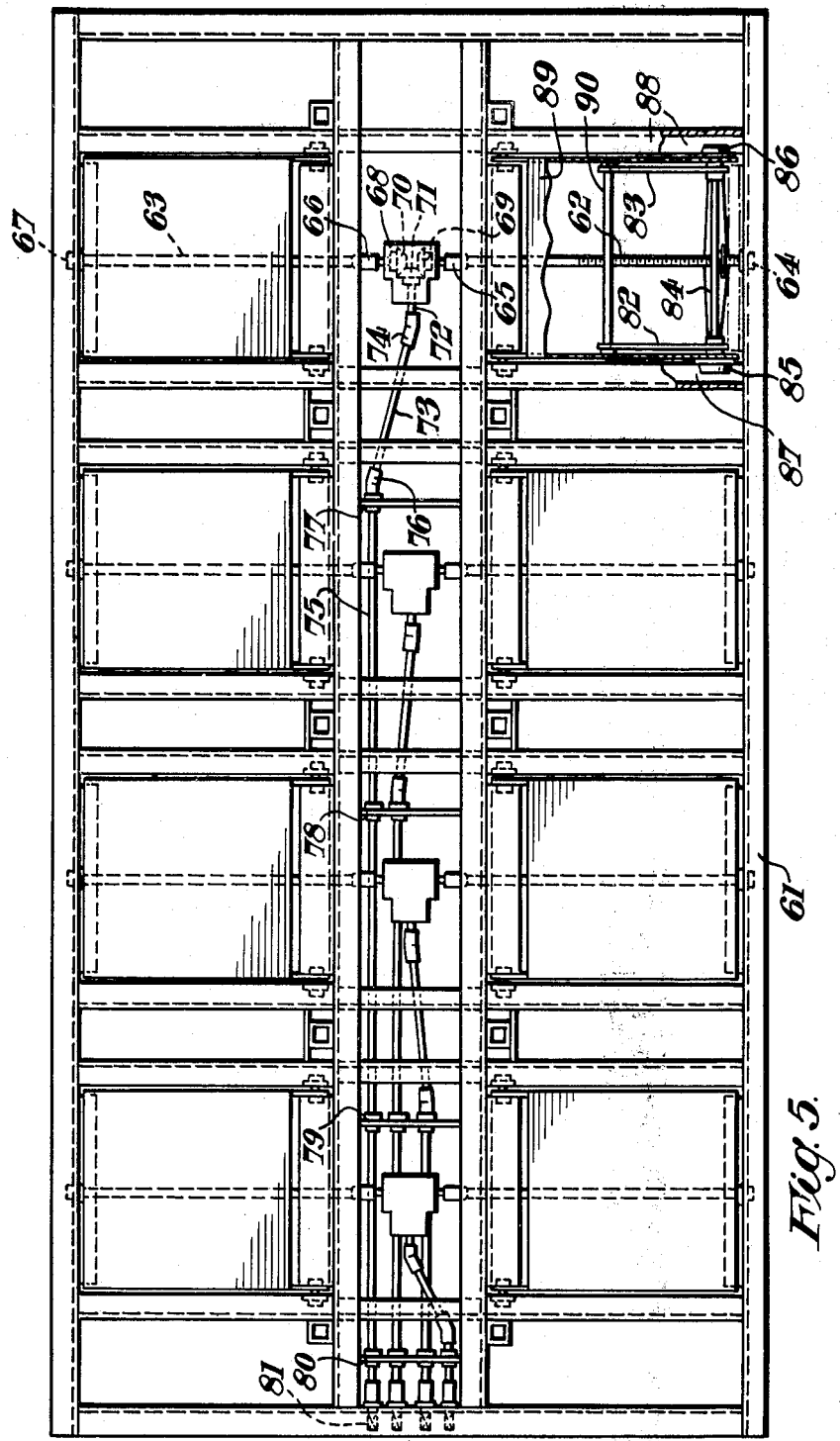
FIG. 5 is a plan view of the embodiment illustrated in FIG. 4.
Figure 6:
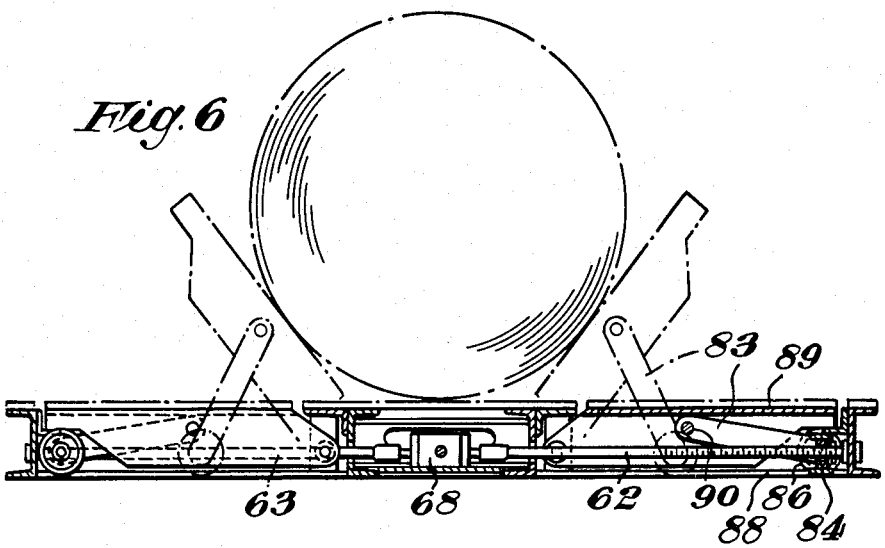
FIG. 6 is a cross-sectional view of a part of the embodiment illustrated in FIGS. 4 and 5.

A second point of difference between the two embodiments of the invention is concerned with the arrangement for supporting the lower ends of the support arms such as those indicated at 82 and 83 in FIG. 5. In this case, the axle 84 carries a pair of wheels 85 and 86 which are shown particularly clearly in FIG. 9. As can be seen, these wheels are rotatable on the ends of the axle 84 and run on rails 87 and 88. The support arms 82 and 83 are also pivotable on the ends of the axle 84.

Figure 7:
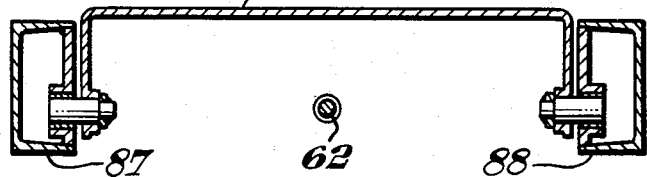
FIGS. 7, 8 and 9 are sectional views on the lines A, B and C, respectively, shown in FIG. 6.

FIG. 7 of the drawings shows the manner in which the platform indicated as 89 is pivotable in bearings in the rails 87 and 88.

Figure 8:
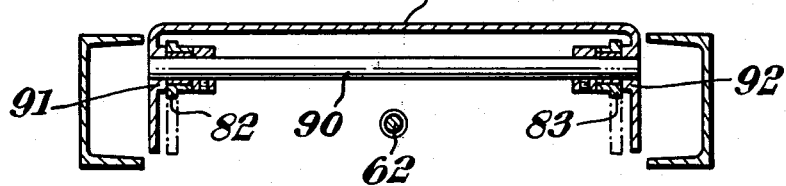
Figure 9:
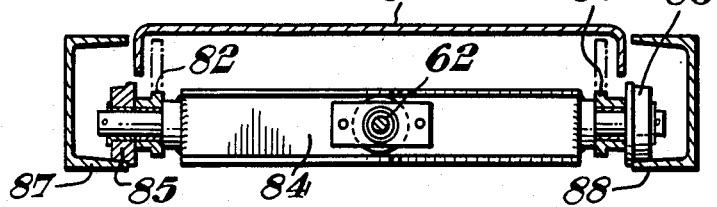

FIG. 8 illustrates the manner in which the support arms 82 and 83 are pivotably secured to the platform 89 by means of an axle 90 fixed in bosses 91 and 92 formed in the side members of the platform.

What is claimed is:

1. A vehicle load securing device for use in the transport of cylindrical objects comprising a flat rectangular framework in which are mounted a plurality of pairs of pivotally-mounted platforms wherein:

said platforms are arranged so that each pair is individually moveable from a first position in which the two platforms of that pair are coplanar to a second position in which the two platforms are relatively inclined and between them provide a support for one of said cylindrical objects;

one platform in each pair is located on one side of the longitudinal axis of the framework while the other platform in each pair is located on the opposite side of said longitudinal axis;

the pivot axes of all the platforms on said one side of the longitudinal axis are coincident, and wherein the pivot axes of all the platforms on said opposite side of the longitudinal axis are also coincident;

said pivot axes are equally spaced from said longitudinal axis;

each platform is movable from said first position to said second position under the control of a pair of support arms, each pivotally attached at one end thereof to the platform; and each of said support arms is pivotally attached at the other end thereof to an axle carrying tracking means running on tracks extending transversely of the framework.

2. A vehicle load securing device as claimed in claim 1, wherein the center of each axle is provided with a nut or threaded block, such as a nut, located on a threaded rod extending transversely of the framework.

3. A pallet as claimed in claim 1, provided with means for removably attaching it to a road vehicle.

4. A vehicle load securing device as claimed in claim 1, provided with means for removably attaching it to a rail truck.

5. A vehicle load securing device as claimed in claim 1, in combination with a transportable container.

6. A vehicle load securing device as claimed in claim 1, in combination with a road vehicle as an integral part thereof.

7. A vehicle load securing device as claimed in claim 1, in combination with a rail truck as an integral part thereof.

8. A vehicle load securing device as claimed in claim 1, in combination with a transportable container as an integral part thereof.

9. A pallet as claimed in claim 8, wherein said container has a removable cover or a removable top and sides.

10. A vehicle load securing device for use in the transport of cylindrical objects comprising a flat, rectangular framework in which are mounted a plurality of pairs of pivotally mounted platforms, wherein:

said platforms are arranged so that each pair is individually moveable from a first position in which the two platforms are relatively inclined and between them provide a support for one of said cylindrical objects;

one platform in each pair is located on one side of the longitudinal axis of the framework while the other platform in each pair is located on the opposite side of said longitudinal axis;

the pivot axes of all the platforms on said one side of the longitudinal axis are coincident, and wherein the pivot axes of all the platforms on said opposite side of the longitudinal axis are also coincident;

said pivot axes are equally spaced from said longitudinal axis;

each platform is moveable from said first position to said second position under the control of a pair of support arms, each pivotally attached at one end thereof to the platform;

each of said support arms is pivotally attached at the other end thereof to an axle carrying tracking means such as friction pads or wheels running on tracks extending transversely of the framework;

the center of each axle is provided with a nut or threaded block located on a threaded rod extending transversely of the framework; and each pair of platforms is controlled by a single rod, the portion of said single rod engaging with one of said nuts or blocks having a thread of one hand and the portion of said rod engaging with the other of said nuts or blocks having a thread of the opposite hand, the arrangement being such that rotation of said rod in one direction causes the two platforms of the pair to rise about their pivot axes and rotation of said rod in the opposite direction causes said two platforms to fall about their pivot axes.

11. A vehicle load securing device as claimed in claim 10, wherein both ends of each of said rods extend through the sides of the framework and are provided with means for the attachment of keys.

12. A vehicle load securing device as claimed in claim 10, wherein separate threaded rods are provided for each platform, and wherein the two rods controlling each pair of platforms are connected to a gearbox located substantially on the longitudinal axis of the framework, the arrangement being such that, when the input shaft of any of said gearboxes is rotated, the two threaded rods connected to that gearbox are rotated in the directions necessary to move the two platforms of the respective pair upwards or downwards together.

13. A vehicle load securing device as claimed in claim 12, wherein the input shafts of said gearboxes are coupled through longitudinally-extending shafts and universal joints to an operating position at one end of the framework.

* * * * *